United States Patent [19]

von Bonin et al.

[11] 4,381,367
[45] Apr. 26, 1983

[54] SIZING AGENTS FOR PAPER AND A PROCESS FOR THE PRODUCTION THEREOF

[75] Inventors: Wulf von Bonin, Leverkusen; Peter Mummenhoff, Cologne; Heinz Bäumgen, Leverkusen, all of Fed. Rep. of Germany

[73] Assignee: Bayer Aktiengesellschaft, Leverkusen, Fed. Rep. of Germany

[21] Appl. No.: 328,009

[22] Filed: Dec. 7, 1981

[30] Foreign Application Priority Data

Dec. 12, 1980 [DE] Fed. Rep. of Germany ....... 3046906
Dec. 12, 1980 [DE] Fed. Rep. of Germany ....... 3046980
Dec. 12, 1980 [DE] Fed. Rep. of Germany ....... 3046981

[51] Int. Cl.$^3$ ............................................. C08F 8/32
[52] U.S. Cl. ................................. 524/549; 524/802; 524/811; 526/272; 526/315; 428/514; 162/168.2; 162/168.6; 162/168.7
[58] Field of Search ............... 526/272, 315; 524/549, 524/802, 811

[56] References Cited

U.S. PATENT DOCUMENTS 4,221,886 9/1980 Topfl ................................. 526/272
4,267,091 5/1981 Geelhaar ........................... 526/315
4,298,513 11/1981 Distler ............................... 526/272

Primary Examiner—Paul R. Michl
Attorney, Agent, or Firm—Connolly and Hutz

[57] ABSTRACT

Paper sizing agents in the form of an aqueous preparation of maleic acid anhydride copolymers of which the anhydride groups had been reacted either with organic or inorganic bases or with primary-tertiary diamines and the reaction products subsequently reacted with epichlorohydrin or with inorganic or organic acids to form salts, the copolymers being made up of polymerised units of (a) from 5 to 75%, by weight, of an aromatic vinyl compound;
(b) from 10 to 75%, by weight, of acrylic and/or methacrylic acid $C_1$-$C_{18}$ alkyl esters;
(c) from 5 to 35%, by weight, of maleic acid anhydride;
(d) from 0 to 25%, by weight, of other vinyl monomers; and
(e) from 0.1 to 10%, by weight, based on the sum of monomers (a) to (d) (which amounts to 100%, by weight), of an unsaturated aldehyde or of an enol ether derived therefrom.

The copolymers are produced by radical polymerisation preferably in the absence of solvents.

5 Claims, No Drawings

SIZING AGENTS FOR PAPER AND A PROCESS FOR THE PRODUCTION THEREOF

This invention relates to sizing agents for paper based on certain maleic acid anhydride copolymers and to a process for the production thereof.

The production of copolymers of maleic acid anhydride with vinyl monomers or olefins has been known for some time. In most cases, polymerisation reactions of this type give alternating copolymers, i.e. copolymers in which the monomers are incorporated in molar ratios of substantially 1:1. This applies in particular to copolymers of maleic acid anhydride with α-olefins, aromatic vinyl compounds, vinyl esters, vinyl ethers, allyl esters and dienes. Maleic acid anhydride is difficult if not impossible to copolymerise with acrylic esters, for example.

Accordingly, it has taken considerable efforts and highly specialised polymersiation techniques to produce copolymers of maleic acid anhydride, for example, with monomers, such as styrene, which contain less than 50 mole percent of maleic acid anhydride uniformly incorporated to a certain extent. The styrene/maleic acid anhydride copolymers obtainable in this way which contain, for example, from 10 to 40 mole percent of incorporated maleic acid anhydride are distinguished by a softening point considerably higher than that of homopolystyrene and hence by a higher melt viscosity.

Apart from the fact that conventional maleic acid anhydride copolymers having a predominantly alternating structure often contain a percentage of potentially hydrophilic groups which is inevitably too high for hydrophobising purposes, the production of polymers of this type by conventional methods has been confined either to the presence of auxiliary solvents or to the use of heavy screw extruders, both requirements which are in need of simplification.

In addition, it is desirable to have inexpensive, non-polluting processes by which it is possible to produce low-melting maleic acid anhydride copolymers which, on the one hand, contain the anhydride incorporated in relatively homogeneous distribution in quantities of from 5 to 30%, by weight, and which, on the other hand, may be carried out at temperatures below 200° C. in a simple stirrer-equipped autoclave without a need to adopt specialised measures for carrying out the reaction and without a need to use auxiliary solvents, i.e. which may be carried out in the form of mass copolymerisation in the melt.

Such polymers would not only be particularly easy to process, but they would also represent desirable intermediates for further reactions on the incorporated maleic acid anhydride group, particularly in cases where an excessive percentage of reactive centres in the polymer is undesirable, such as in the reaction to form emulsifiers, other surface-active auxiliaries, textile finishing agents or graft polymers.

However, polymers of the type in question would be of particular interest as intermediates for the production of paper sizing agents.

This is because it is known that conventional, i.e. predominantly alternating, maleic acid anhydride copolymers may be converted, for example by reaction with ammonia, into highly effective sizing agents, an effect which, although observed where diisobutylene is used as the comonomer, is not observed where styrene, for example, is used as the comonomer, because in the latter case the alternating polymer is too hydrophilic to be able to develop an adequate sizing effect.

It has now surprisingly been found that the required low-melting polymers may be obtained by preferably solvent-free polymerisation providing the polymerisation reaction is carried out in the presence of unsaturated aldehydes or, more particularly, in the presence of enol ethers derived therefrom. It has been found that monomer mixtures of aromatic vinyl compounds, such as styrene, within certain concentration limits with maleic acid anhydride and methacrylates or acrylates, such as butyl acrylate, may be reacted almost completely with radical initiators, optionally in the presence of small quantities of other monomers, in the presence of unsaturated enol ethers, particularly those of the type derived from tetrahydrobenzaldehydes (or even these aldehydes themselves) and in the absence of additional solvents, the reaction being carried out at from 120° to 250° C. in a simple stirrer-equipped vessel, to form a polymer, the melt viscosity of which is lower by approximately one power of ten than that of polymers produced without these enol ethers or aldehydes. Polymers of this type obtainable in the absence of solvents are excellent starting materials for the production of highly effective paper sizing agents by reacting the anhydride group with inorganic or organic bases, particularly ammonia.

Accordingly, the process according to the present invention provides for the solvent-free production of maleic acid anhydride copolymers containing less than 50%, by weight, of maleic acid anhydride which are particularly suitable for processing into sizing agents.

The present invention relates to paper sizing agents in the form of an aqueous preparation of maleic acid anhydride copolymers of which the anhydride groups have been reacted with from 0.2 to 10 times the molar quantity of organic or inorganic bases, or with primary-tertiary diamines, preferably with 1-dimethylamino-3-propylamine, and the reaction products subsequently reacted with epichlorohydrin or with inorganic or organic acids, preferably with acetic acid, to form salts, in which case the copolymers are made up of polymerised units of (a) from 5 to 75%, by weight, preferably from 15 to 55%, by weight of an aromatic vinyl compound;

(b) from 10 to 75%, by weight, preferably from 35 to 65%, by weight, of acrylic and/or methacrylic acid $C_1$-$C_{18}$ alkyl ester;

(c) from 5 to 35%, by weight preferably from 10 to 25%, by weight, of maleic acid anhydride;

(d) from 0 to 25%, by weight, preferably from 0 to 15%, by weight, of other vinyl monomers; and (e) from 0.1 to 10%, by weight, preferably from 0.5 to 3.5%, by weight, based on the sum of monomers (a) to (d) which amounts to 100%, by weight, of an unsaturated aldehyde or of an enol ether derived therefrom.

To produce the sizing agents according to the present invention, monomers (a) to (e) are polymerised while stirring in the presence of from 0.01 to 3%, by weight, preferably from 0.1 to 0.5%, by weight, based on the sum of monomers (a) to (d), of conventional radical initiators at from 100° to 250° C., preferably from 140° to 180° C., preferably in the absence of solvents. The anhydride groups of the resulting polymer are reacted either with inorganic and/or organic bases, particularly ammonia, and the reaction product converted into an aqueous preparation which is used as a sizing agent for paper, or, alternatively, the anhydride groups are reacted with primary-tertiary diamines, preferably 1-dimethylamino-3-propylamine, and the reaction product subsequently reacted with epichlorohydrin or with inorganic or organic acids, preferably with acetic acid, to form salts and the product of this reaction is converted into an aqueous preparation used as a sizing agent for paper.

Sizing agents according to the present invention include both those of the type used as pulp sizing agents, i.e. added to the pulp during the paper making process, and also so-called "surface sizing agents", which are applied to the finished sheet of paper. Suitable papers are, in principle, any types of paper, for example unfilled paper or paper filled with chalk, talcum or clay, or papers produced from or containing mechanical wood pulp, sulphite cellulose, sulphate cellulose or regenerated cellulose. Paper made from synthetic pulps may also be used. The use of alum, starch, lighteners, dyes and other sizing agents may also be considered. The effect of the sizing agent is, of course, in no way limited to paper, instead the sizes may also be used for cards and cardboards, woven fabrics and non-wovens of natural and synthetic raw materials.

The preferred aromatic vinyl compound is styrene, although it is also possible to use nucleus-substituted and side-chain-substituted aromatic vinyl compounds, such as vinyl naphthalene, styrenes containing hydroxyl, alkyl, halogen or halo-alkyl substituents in the nucleus and/or in the side chain such as methyl styrenes, chlorostyrenes, fluoroalkyl styrenes, α-methylstyrene and isopropenyl phenol.

Suitable (meth)acrylates are esters of methacrylic acid and, preferably, of acrylic acid with alcohols containing from 1 to 18 carbon atoms. n-butyl acrylate is preferably used because it is easy to obtain and has a sufficiently high boiling point. It is, of course, also possible to use other (meth)acrylic acid esters, for example of methanol, ethanol, propanol, butanols, cyclohexanol, benzyl alcohol, isooctanol, isononyl alcohol, decanol and oleyl alcohol, optionally in admixture with one another, and also esters of alcohols containing other functional groups providing they do not enter into undesirable secondary reactions with the maleic acid anhydride.

Other suitable vinyl monomers which may optionally be used are, for example, acrylic acid, methacrylic acid, fumaric acid, maleic acid, itaconic acid, (meth)acrylonitrile, (meth)acrylamides and N-substitution products thereof, vinyl pyrrolidone, vinyl ketones, vinyl amides, vinyl halides, vinyl ethers, vinyl esters, such as vinyl acetate, α-olifins, such as ethylene, propylene, butylene and isobutylene, particularly those having relatively high boiling points, such as diisobutylene, oligobutylenes, oligopropylenes, octadecene, limonene, norbornene, and diesters and semiesters of maleic, fumaric or itaconic acid. Of these monomers, acrylonitrile and/or α-olefins, such as octadecene, are preferably used.

Suitable unsaturated enol ethers are particularly those which have the following basic structure:

R₁R₂C=CR₃—CHR₄—CR₅=CR₆OR₇ wherein
R₁, R₃ and R₄, which may be the same or different, each represents H or alkyl, preferably H or methyl;
R₂ and R₅ which may be the same or different, each represents H or alkyl containing from 1 to 4 carbon atoms, or, preferably, R₂ and R₅ together represent —CH₂—CH₂ completing a ring;
R₆ represents alkyl containing from 1 to 4 carbon atoms, or, preferably H; and
R₇ represents an alkyl or alkaryl radical containing from 1 to 18 carbon atoms, preferably benzyl.

It is preferred to use unsaturated enol ethers of the type derived from 1,2,5,6-tetrahydrobenzaldehyde, particularly the following benzyl ether:

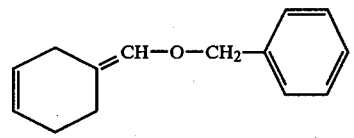

Suitable tetrahydrobenzaldehydes are substituted and/or unsubstituted tetrahydrobenzaldehydes, particularly 1,2,5,6-tetrahydrobenzaldehyde and/or substituted analogues thereof, such as 3- or 4-methyl-1,2,5,6-tetrahydrobenzaldehyde.

The mode of action of these auxiliary monomers, which possibly form complexes with maleic acid anhydride, is based on the fact that, with the assistance thereof, low-melting polymers are surprisingly formed and the spontaneous polymerisation of the reaction mixture containing styrene and maleic acid anhydride, for example alongside one another at low temperatures is prevented without an adverse effect upon the required polymerisation reaction at the high temperatures applied in the process.

Suitable radical initiators are the initiators normally used in this field, for example azo-compounds or peroxide compounds. It is preferred to use initiators of the type, particularly peroxide initiators, which have half-lives of more than one minute at 120° C., such as benzoyl peroxide, t-butyl peroctoate, di-t-butyl peroxide, t-butyl hydroperoxide, dicumyl peroxide and cumene hydroperoxide. Initiator mixtures may also be used. In principle, heat alone or high-energy radiation may also be used for initiating the polymerisation reaction.

In the context of the present invention, inorganic bases are to be understood in particular to be hydroxides, carbonates, biocarbonates or alcoholates of the alkali metals, also ammonia is particularly preferred for reacting the polymers containing anhydride groups to form higly effective sizing agents. It is also possible to use organic bases, particularly primary, secondary or tertiary amines, tertiary amines having to be used above all where water is present so that salt formation may take place. Bases of this type are, for example, alkylamines, hydroxyalkylamines or substituted or unsubstituted morpholine and pyridine, such as methylamine, ethylamine, diethylamine, triethylamine, ethanolamine, propanolamine, diethanolamine and triethanolamine. The amines may be used in admixture with one another or together with ammonia or the inorganic bases.

However, it is of particular advantage to use ammonia in which case the amide-ammonium salts of the polymers soluble or suspendable in aqueous or aqueous-alcoholic media are probably formed first of all. During the sizing process, the semiamide structures may possibly be converted into imide groups characterised by reduced solubility in water. Whether imide formation may actually take place in the aqueous sizing preparation itself would appear to depend upon the reaction conditions.

So far as the assumed formation of the semiamide-ammonium salt is concerned, ammonia is preferably used in more than the stoichiometric quantity for the reaction, for example in from two to ten times the stoichiometric quantity. Organic bases are used in the stoichiometric quantity or in up to ten times the stoichiometric quantity, while inorganic bases are used in quantities of from 0.2 to 2 moles, preferably from 0.5 to 1.8 moles, per anhydride group in the polymer.

To carry out the reaction, the polymers are preferably dissolved while stirring in an aqueous solution of the inorganic and/or organic base at temperatures of from 5° to 190° C., preferably from 15° to 120° C., optionally after dispersion in water. The use of water-soluble auxiliaries such as urea, wetting agents and dispersants for the polymer may have to be considered, suitable auxiliaries of this type being, for example, acetone, methanol, ethanol, isopropanol or mixtures thereof. It is preferred to use isopropanol, in which case the quantity in which the auxiliary solvent is used should not exceed the weight of the polymer used in order to avoid pollution of the environment or the need for elaborate recovery measures. The surprisingly low-viscosity aqueous sizing preparations according to the present invention have solids contents of from 1 to 60% by weight, preferably from 10 to 30%, by weight. However, it is also possible to use anhydrous powder-form preparations which need only be converted into the aqueous medium in situ.

Suitable primary-tertiary diamines are particularly those of the type wherein the primary and tertiary amino groups are separated by a linear or branched chain containing from 2 to 12, preferably from 2 to 6 carbon atoms and, optionally, oxygen or sulphur atoms. The substituents of the tertiary amino group may be the same or different and are aromatic radicals, such as phenyl, tolyl, xylyl, chlorophenyl, nitrophenyl, 4-dimethylaminophenyl, preferably phenyl, tolyl and xylyl; araliphatic radicals, such as benzyl, 2-phenylethyl, preferably benzyl; alkyl radicals containing from 1 to 12, preferably from 1 to 6, carbon atoms; the two substituents may together form a 5- or 6-membered alicyclic ring optionally containing an oxygen or sulphur atom. Amines of this type correspond to to formulae exemplified below:

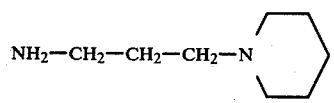

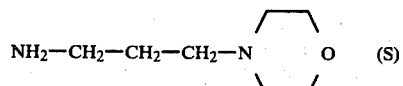 (S)

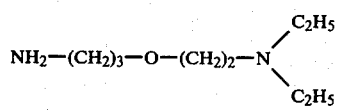

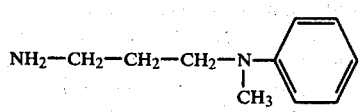

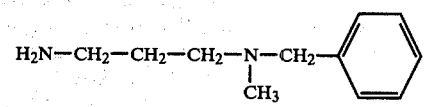

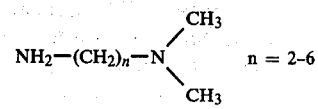 n = 2-6

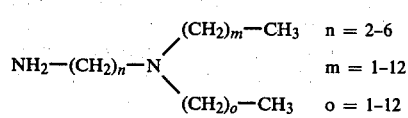 n = 2-6, m = 1-12, o = 1-12

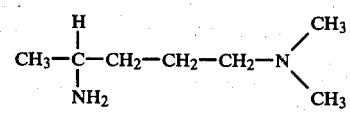

It is also possible to use primary monoamines in addition to the described diamines.

Suitable primary monoamines which may optionally be used in admixture with the diamines are heterocyclic, aromatic, araliphatic, aliphatic and cycloaliphatic amines. These amines may contain saturated or unsaturated hydrocarbon radicals, optionally substituted hydrocarbon radicals. The substituents may be, for example, halogen atoms, such as chlorine, phenolic or aliphatic primary, secondary or tertiary OH-groups, nitro groups, carboxyl groups, thiol groups, ether or thioether groups, sulphonate or urethane or amide groups.

If monoamines are used at all, it is preferred to use ammonia and/or aliphatic primary monoamines containing from 1 to 20 carbon atoms which optionally contain OH-groups, or cycloaliphatic monoamines containing from 5 to 7 carbon atoms. The preferred class of amines includes, for example, methylamine, propylamine, t-butylamine, cyclopentylamine, cyclohexylamine, hexahydrobenzylamine, 2-ethylhexylamine, oleylamine, stearylamine, allylamine, ethanolamine, propanolamine, glucamine or mixtures thereof.

The diamine and, optionally, the monoamine are used in substantially equimolar quantities, based on the anhydride groups in the starting polymer. The amine used should preferably contain from 0.8 to 1.3 moles of primary amino groups per mole of anhydride groups in the polymer.

In the mixture of diamine and primary amine optionally used, the molar ratio of diamine to primary amine should amount to from 1:10 to 1:0.1, preferably from 1:4 to 1:0.3.

The amine components may be reacted either in admixture or successively.

The reaction of the polymers with the amines is preferably carried out in the absence of solvents at from 80° to 250° C., preferably from 140° to 200° C., in a stirrer-equipped vessel. Although the water formed in the reaction may be distilled off, optionally together with any residual monomers still present, this is not absolutely essential and may therefore be omitted. In most cases, the reaction is over after from 30 to 360 minutes. In general, the reaction mixture is stirred for about 3 hours at about 170° C.

The reaction of the resulting reaction product, which now contains cyclic imide units, with the epichlorohydrin may be carried out in the presence or absence of auxiliary solvents which as far as possible should be soluble in water and physiologically compatible. In addition to water itself, optionally used in conjunction with acids, such as acetic acid, preferred solvents are acetone, ethanol or isopropanol, although it is, of course, also possible to use other solvents which satisfy the above-mentioned requirements. The organic auxiliary solvents are generally used in such quantities that the solutions or dispersions formed do not have solvent contents in excess of 50% to avoid environmental pollution or the need for elaborate recovery measures.

Although in principle a variety of quaternising agents, such as benzyl chloride, chloroacetamide, dialkyl sulphates, dichloropropane and chlorohydrin, may be used for the reaction of the polymers containing amino groups to form highly effective sizing agents, it has been found that superior sizing agents are obtained where epichlorohydrin is used.

From 0.1 to 5 moles, preferably from 0.5 to 3.5 moles, more particularly from 0.5 to 2.5 moles of epichlorohydrin are used, based on the amino groups present in the polymer used.

The reaction with the epichlorohydrin is carried out by adding the epichlorohydrin to the polymer reacted with the amine or to a solution or dispersion thereof which preferably is aqueous or contains quantities of water, because this accelerates the reaction, and then stirring the reaction mixture for from 10 to 120 minutes, preferably about 60 minutes, at from 10° to 95° C., preferably from 15° to 80° C. Water is then added optionally and the required concentration of the sizing agent now present in the form of an aqueous solution or dispersion is thus adjusted. Removal of the auxiliary solvent used if any, for example by distillation or stripping, may be carried out at any stage of the process. It is advisable to adjust the sizing preparations to a pH of below 7.5, preferably from 5 to 6.5, using an acid, preferably acetic acid or formic acid, because in this way any subsequent change in the viscosity of the preparations may be avoided. Although a variety of organic or inorganic acid (or mixtures thereof), such as HCl, HNO$_3$, H$_2$CO$_3$, H$_2$SO$_3$, H$_2$SO$_4$, H$_3$PO$_4$ and HPO$_3$ may be used as the acids, it is preferred, for reasons of corrosion, to use organic acids, particularly formic acid and/or acetic acid.

More than 0.3, preferably from 0.5 to 6, acid equivalents are used, based on the amino groups present in the polymer used, although the limit of 6 equivalents may readily be exceeded, for example in cases where a relatively strongly acid sizing solution is to be used.

The reaction with the acid is carried out by adding the acid to the polymer reacted with the amine or to a solution or dispersion thereof preferably containing quantities of water and stirring for from 10 to 120 minutes, preferably about 10 minutes, at from 10° to 90° C., preferably from 15° to 50° C. More water is then added and the required concentration of the sizing agent, which is now present in the form of an aqueous solution or dispersion, is thus adjusted. The auxiliary solvent used, if any, may be removed at any stage of the process, for example by distillation or stripping. It is advisable to adjust the sizing agent preparations to a pH of below 7, preferably from 5 to 6.8, by the addition of acetic acid or formic acid.

The production of the polymers according to the present invention and the reaction products thereof which are to be used as sizing agents may be carried out continuously or in batches, in stages or by a one-pot process using techniques known to those skilled in the art.

For example, the previously-prepared monomer mixture, to which the initiator may already have been added or to which it is separately added during the polymerisation process, is introduced under atmospheric pressure or under elevated pressure over a period of from a few minutes to hours into a vessel which is maintained at the reaction temperature and which is provided with a powerful stirrer and, optionally, with a reflux condenser. Stirring is then continued at the reaction temperature until only a gentle reflux, if any, is to be observed, which normally takes from 0.5 to 3 hours.

In one interesting and, in many cases, advantageous procedure, the methacrylate monomers (b), the maleic acid anhydride (c), all or part of the auxiliary monomers (e) and, optionally, more vinyl monomer (d) are initially introduced into a reaction vessel, which is operated in the absence of pressure, for example with a reflux condenser, or under pressure, and heated to the reaction temperature, after which the aromatic vinyl compounds (a), the rest of the auxiliary monomers (e) and the initiators are added to this monomer mixture, for example in the form of a mixture of components or even separately, over a period of from 0.5 to 2 hours, optionally with cooling. The polymers obtainable by this process, which is particularly to be recommended where the maleic acid anhydride and aromatic vinyl compound are present in a molar ratio of from 1:<1 to 1:2, are at least as suitable for conversion into sizing agents as the polymers obtainable by simultaneous introduction of the monomers, but show a lesser tendency towards discolouration than those polymers.

The polymer in the reaction vessel may then be

The polymer in the reaction vessel may then be further processed or, alternatively, the polymer is directly introduced in the form of a melt or granulate into the thoroughly-stirred aqueous phase, followed by stirring until a homogeneous solution or suspension is formed at the required temperature. Excess base, monomer or solvent fractions may be removed, if present or if necessary, by stripping or distillation.

For example, the acid may be added to the polymer reacted with the diamine in the reaction vessel or, alternatively, the polymer reacted with the diamine may be converted beforehand, for example, into a from 50 to 70% solution in acetone or isopropanol which may then be further processed in the same way as described above. In another alternative procedure, the polymer is directly introduced into a thoroughly-stirred aqueous acetic acid solution, followed by stirring until a homogeneous solution or suspension is formed at the required temperature. If necessary, any solvent fractions present may be removed by stripping or distillation.

The aqueous preparation formed may be used as a sizing agents either directly or, optionally, after further temperating processes, degassing or dilution. In most cases, the sizing process itself is carried out after further dilution of the aqueous preparation to concentrations below 5%, by weight.

It is also possible to add substances containing guanidine, urea, dicyanodiamide, allophanate and similar amide groups to the aqueous sizing agent preparation to reduce the viscosity thereof. These additives may be used in quantities of up to 50%, based on the polymer.

The process according to the present invention is illustrated in the following Examples in which the parts and percentages quoted represent parts and percentages by weight, unless otherwise indicated.

Another object of the present invention is to provide a technically advantageous process, i.e. a very simple process which may be carried out virtually as a "one-pot process" for obtaining useful sizing agents. The process in question is a process for the solvent free production of certain maleic acid anhydride copolymers and paper sizing agents obtainable therefrom.

Accordingly, the object of the following Examples is, on the one hand, to exemplify the advantageous way in which the maleic acid anhydride copolymers may be produced and, on the other hand, to show that the polymers obtainable in accordance with the present invention are suitable for use as a starting material for highly effective sizing agents.

Accordingly, advantage of the process according to the present invention lies in the fact that certain maleic acid anhydride copolymers may be produced in a technically advantageous manner and also in the suitability thereof for use in the production of high effective sizing agents.

The maleic acid anhydride copolymers used in the following for the production of sizing agents are obtained for example, by the following general method:

The aromatic vinyl compound is mixed with the acrylate, the other vinyl monomers used, if any and the tetrahydrobenzaldehyde or the unsaturated enol ether, followed by addition of the maleic acid anhydride. The mixture is then stirred at from 30° to 45° C. until a solution is formed.

In the absence of the enol ether, the polymerisation reaction often begins undesirably even at this preparatory stage. However, this does not happen when the enol ether is present.

0.5 part of t-butyl peroctoate, 0.5 part of t-butyl hydroperoxide and 0.2 part of dicumyl peroxide are added to 500 parts of the monomer solution which is then introduced over a period of 30 minutes under normal pressure into a vessel equipped with a powerful stirrer and a reflux condenser and pre-heated to from 160° to 170° C. Even in this phase of the process, the presence of the enol ether prevents undesirable polymerisation outside the polymerisation vessel. Although there is no need to work under a nitrogen atmosphere, nitrogen may be introduced into the reaction vessel, for example to avoid discolouration.

The monomer mixture polymerises very quickly during the actual introduction phase, the polymerisation reaction being over from 30 to 180 minutes after the monomers have been introduced.

The reaction products with ammonia are produced, for example, as follows:

A mixture of 250 parts of 25% aqueous ammonia and 1500 parts of water is accommodated in a stirrer-equipped vessel. 300 parts of the polymer melt, which has a temperature of the order of 170° C., are then introduced, with stirring, into the mixture which is at room temperature, the polymer being suspended or dissolved. After stirring for another 2 hours at from 35° to 45° C., an approximately 15% aqueous sizing agent preparation is obtained and may be used either directly or after further dilution.

To produce the reaction products with diamine, 1-dimethylamino-3-propylamine, for example, is used as the primary-tertiary-diamine. It is added to the stirred, freshly prepared polymer at 160° C., followed by stirring for 1.5 hours at that temperature. The melt viscosity of the material decreases in that time, so that the melt may be cooled while stirring to about 110° C. and optionally, to enable it to be handled more easily, a solution of the polymeric reaction product may be prepared by the addition of acetone or isopropanol as auxiliary solvent. This solution is then stirred for another 30 minutes at the boiling point of the solvent and then used for the reaction with the acid or the epichlorohydrin.

The reaction with the acetic acid is carried out for example, at 20° C. 50% solutions of the freshly prepared basic polymers are used. The acid is added to the polymer solution, followed by dilution with water to a solids content of about 15%. The resulting aqueous preparations are used as sizing agents.

To produce the reaction products with formic or acetic acid, the following alternative procedure, for example, may be adopted:

A mixture of 250 parts of 20% aqueous formic acid and 1500 parts of water is accommodated in a stirrer-equipped vessel. 300 parts of the polymer melt which has a temperature of about 170° C. are then run, with stirring, into the mixture which is at room temperature, the polymer being suspended or dissolved. After stirring for another 2 hours at from 35° to 45° C., an about 15% aqueous sizing agent preparation is obtained and may be used either directly or after further dilution.

The reaction with the epichlorohydrin is carried out, for example, at 20° C. The 50% solutions of the freshly prepared basic polymers are used. A little water is added to the polymer solution, followed by the epichlorohydrin. After stirring for 1 hour at 20° C., the product is diluted with water to a solids content of about 15% and adjusted to a pH of about 6.5 using acetic acid. It is, of course, also possible to add the acetic acid before the dilution with water, in other words there are four variants available for use in this case. The resulting aqueous preparations are used as sizing agents.

The following monomers, for example, are used for producing the polymers by the process according to the present invention:
(a) a: styrene
(b) a: n-butyl acrylate
    b: iso-octylacrylate
    c: decyl methacrylate
(c) a: maleic acid anhydride
(d) a: acrylonitrile
(e) a: 1,2,5,6-tetrahydrobenzaldehyde
    b: a mixture of substantially equal parts of 3-methyl- and 4-methyl-1,2,5,6-tetrahydrobenzaldehyde
    c: the enol ether of 1,2,5,6-tetrahydrobenzaldehyde

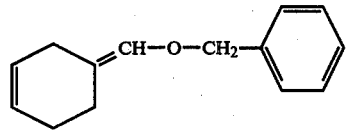

The individual polymers are shown in Table 1 below.

The polymer series zero to five is intended in particular to illustrate the considerable reduction in melt viscosity which is obtained by using the additives (e) according to the present invention referred to as auxiliary monomers and which thus enables the process to be carried out in the absence of a solvent.

The polymers identified in Table 1 are converted in selected samples into the sizing agents according to the present invention in the manner described in the foregoing. In the following, the number of polymer corresponds to the number of the sizing agent.

The surface sizing effect is tested by the so-called "ink float test". In this test, an unsized or pre-sized paper is treated with the sizing agent and then placed on top of liquid ink. The period of time which elapses before the ink penetrates through the paper from the underneath and is visible on the surface is a measure of the sizing effect of the tested substance. This method provides for reliable relative assesments of the various substances tested, particularly if the individual test is repeated several times. A prior art sizing agent is preferably used for comparison purposes in the tests.

II. The measured times are shown as average values in Table 2.

Ink Float Test
TABLE 2

| Sizing agent No. | Ink Float Test Time I (mins.) | Time II (mins.) |
| --- | --- | --- |
| Comparison | 8 | 15 |
| 6 | 11 | 25 |
| 17 | 10 | 21 |
| 2 | 8 | 18 |
| 5 | 8 | 19 |
| 3 | 7 | 16 |
| 9 | 7 | 15 |

TABLE 1

| Polymer | | No. | 0 | 1 | 2 | 3 | 4 | 5 | 6 | 7 | 8 |
| --- | --- | --- | --- | --- | --- | --- | --- | --- | --- | --- | --- |
| Monomer (a) | a: | parts | 30 | 30 | 30 | 30 | 30 | 30 | 25 | 25 | 65 |
| Monomer (e) | a: | " | — | 1.5 | 0.75 | — | — | — | — | — | — |
| | b: | " | — | — | — | — | — | 1.5 | — | 0.5 | — |
| | c: | " | — | — | — | 1.5 | 0.75 | — | 1.5 | 1.5 | 3.0 |
| Monomer (b) | a: | " | 50 | 50 | 50 | 50 | 50 | 50 | 40 | 55 | 25 |
| | b: | " | — | — | — | — | — | — | — | — | — |
| | c: | " | — | — | — | — | — | — | — | — | — |
| Monomer (c) | a: | " | 20 | 20 | 20 | 20 | 20 | 20 | 20 | 15 | 10 |
| Monomer (d) | a: | " | — | — | — | — | — | — | 15 | 5 | — |
| Melt viscosity at 160° C. (Pas) | | | $2.85 \cdot 10^3$ | $4.7 \times 10^2$ | $5.5 \cdot 10^2$ | $2.4 \cdot 10^1$ | $1.65 \cdot 10^2$ | $2.2 \cdot 10^2$ | $5.8 \cdot 10^2$ | $9.4 \cdot 10^1$ | |

| Polymer | | No. | 9 | 10 | 11 | 12 | 13 | 14 | 15 | 16 | 17 |
| --- | --- | --- | --- | --- | --- | --- | --- | --- | --- | --- | --- |
| Monomer (a) | a: | parts | 30 | 35 | 40 | 30 | 20 | 15 | 60 | 20 | 25 |
| Monomer (e) | a: | " | — | — | — | — | — | — | — | — | — |
| | b: | " | — | — | — | — | — | — | — | — | — |
| | c: | " | 2.0 | 1.3 | 1.5 | 1.5 | 1.5 | 0.5 | 3.0 | 1.5 | 1.5 |
| Monomer (b) | a: | " | — | — | 40 | 50 | 60 | 65 | 20 | 50 | 45 |
| | b: | " | — | 40 | — | — | — | — | — | — | — |
| | c: | " | 45 | — | — | — | — | — | — | — | — |
| Monomer (c) | a: | " | 25 | 25 | 20 | 20 | 20 | 15 | 20 | 30 | 20 |
| Monomer (d) | a: | " | — | — | — | — | — | 5 | — | — | 10 |
| Melt viscosity at 160° C. (Pas) | | | $2.3 \cdot 10^2$ | $2.8 \cdot 10^2$ | | | | | | | |

Since it is the effect of the sizing agents based on the reaction products of the polymers with ammonia which is to be demonstrated first in the following Examples, sizing agent A according to German Pat. No. 2,304,586 was used for comparison, being an ammoniacal aqueous solution of a solution copolymer of maleic acid ester, styrene and acrylic acid into which imide groups are subsequently introduced.

The test was carried out as follows:

The paper used was a 75 g/m² paper produced from 50 parts of softwood sulphate cellulose, 50 parts of hardwood cellulose, 0.12 part of a conventional commercial whitening agent, 20 parts of talcum; low alum content (pH 5 in the breast box).

Pieces measuring approximately 4 cm² are punched out from the paper and impregnated by immersion for 10 seconds at 20° C. in a 0.5% solution of the sizing agent in tap water. The pieces of paper were then squeezed between filter paper to remove excess solution. The pieces of paper were then dried for 4 minutes at 120° C. in a recirculating air cabinet, subsequently conditioned for 1 hour at room temperature and humidity and placed on top of the ink conventional commercial fountain-pen ink diluted with distilled water in a ratio of 1:1). All the samples were treated 5 times in the same way.

The period elapsing before the first patches of ink appeared on the surface was measured as time I. The period elapsing before the ink had penetrated through to cover about 50% of the surface was measured as time II.

| 10 | 8 | 13 |
| 14 | 7 | 18 |
| 7 | 6 | 12 |
| 11 | 6 | 11 |
| 12 | 5–6 | 10 |
| 13 | 5–6 | 10 |
| 16 | 5–6 | 9 |

The effect of the sizing agents was also tested on the following papers:

Paper I:
Bleached cellulose
12% of talcum ash
1% of alum
75 g/m².

Paper II:
Bleached cellulose
10% of calcium carbonate ash
(corrected CaO-value)
80 g/m².

The papers were treated with a solution of the following composition in a conventional laboratory sizing press:
5% of starch
0.2% of active sizing agent,
balance water,
pH approximately 7.0.

Sizing agent A according to German Pat. No. 2,304,586 was again used for comparison.

After the papers had been dried at 100° C. on a drying cylinder, they were conditioned for 2 hours at room temperature and the sizing effect subsequently tested on the basis of the amount of water taken up. To this end, pieces of the paper were pre-weighed, immersed in water at 20° C. for 1 minute, squeezed once between filter paper under a roller weighing 10 kg and then re-weighed. The value for the water uptake on both sides in g/m² is calculated from the difference between the two weights. The lower the water take up, the better the sizing effect. The sizing effect obtained may be regarded as good if a water uptake of the order of 40 g/m² or lower is reached.

TABLE 3

| Sizing agent according to Example No. | Water uptake [g/m²] | |
| --- | --- | --- |
| | paper I | paper II |
| Comparison | 30 | 41 |
| 6 | 24 | 33 |
| 17 | 28 | 36 |
| 2 | 30 | 42 |
| 5 | 30 | 44 |

The following polymers and sizing agent preparations obtained therefrom are used in the following Examples:

Polymer 18

275 parts of butyl acrylate, 100 parts of maleic acid anhydride and 1.6 parts of enol ether (c) (monomer type (e) are initially introduced into a polymerisation vessel equipped with a stirrer and reflux condenser.

After heating to 170° C., the following polymerisation mixture is run in over a period of 30 minutes at boiling temperature: 125 parts of styrene, 0.4 part of the same enol ether as above (c), 0.5 part of t-butyl peroctoate, 0.5 part of t-butyl hydroperoxide and 0.2 part of dicumyl peroxide. The mixture is then stirred for 3 hours at 170° C.

Sizing agent 18

A solution pre-heated to about 50° C. of 250 parts of about 25% aqueous ammonia in 1500 parts of water is added with stirring at 120° C. to 300 parts of a melt of polymer 18, followed by stirring while cooling until the contents of the polymerisation vessel have changed into a homogeneous dispersion. This dispersion has a solids content of about 15%. 100 parts of urea may be added to it to improve its fluidity without any loss of sizing effect. However, since the fluidity of the sizing agent is entirely adequate in the present case, the urea-free material is used in the sizing test carried out by way of example.

Polymer 19

250 parts of butyl acrylate, 25 parts of acrylonitrile, 100 parts of maleic acid anhydride and 1.6 parts of enol ether (c) are initially introduced into a polymerisation vessel in the same way as before.

After heating to boiling, the following mixture is run in over a period of 30 minutes, during which the temperature is allowed to rise to 170° C.: 125 parts of styrene, 0.4 part of the same enol ether as above (c), 0.5 part of t-butyl peroctoate, 0.5 part of t-butyl hydroperoxide and 0.2 part of dicumyl peroxide.

After stirring for 3 hours at 170° C., followed by cooling, the melt is granulated.

Sizing agent 19

30 parts of granulate of polymer 19 are dissolved while stirring at room temperature in a mixture of 25 parts of about 25% ammonia and 150 parts of water to form an about 14% aqueous dispersion. This preparation may be used immediately.

Polymer 20

20 parts of a polymer mixture of the following composition are initially introduced into a polymerisation vessel in the same way as before: 25 parts of styrene, 45 parts of butyl acrylate, 10 parts of acrylonitrile, 20 parts of maleic acid anhydride, 1.5 parts of the same enol ether as before (c), 0.1 part of t-butyl peroctoate, 0.1 part of t-butyl hydroperoxide and 0.05 part of dicumyl peroxide.

After heating to boiling, the temperature is raised to 170° C. over a period of 30 minutes, during which the rest of the mixture is uniformly introduced into the reaction vessel.

After stirring at 170° C., the polymer melt formed is run off and granulated.

Sizing agent 20

30 parts of powdered granulate of polymer 20 are dissolved at room temperature in a mixture of 25 parts of about 25% aqueous ammonia and 150 parts of water to form a finely divided dispersion. The about 15% dispersion obtained is used for sizing purposes.

The following papers was used for testing the sizing effect of polymers 18, 19 and 20:

Paper I
50% of softwood sulphate cellulose, bleached and ground to a fineness of 35°SR;
50% of hardwood sulphate cellulose, bleached and ground to a fineness of 35°SR;
pH in the breast box 7.5; 8.7% of kaolin ash Paper II
50% of softwood sulphate cellulose, bleached and ground to a fineness of 28°SR;
50% of hardwood sulphate cellulose, bleached and ground to a fineness of 28°SR;
approximately 7% of chalk ash Paper III
50% of softwood sulphate cellulose, bleached and ground to a fineness of 35°SR;
50% of hardwood sulphate cellulose, bleached and ground to a fineness of 35°SR;
0.2% or rosin size (based on cellulose)
0.5% of alum (based on cellulose)
at 3% pulp density pH 5.5
approximately 12% of China Clay Ash.

Using a Mathis laboratory sizing press (throughput 4 meters per minute for a contact pressure of 50%), the papers were sized with a sizing solution which, in addition to water, contained the specified amount of sizing agent and 5% of low-viscosity oxidised potato starch. The papers were then dried for about 150 seconds at 100° C.

The papers have a weight per unit area of the order of 80 g/cm².

The ink float test used to assess the sizing effect is carried out as follows:

The papers are cut into strips measuring 2×8 cm, placed on top of test ink according to DIN 53126 and the penetration of the ink after the time indicated is visually assessed as follows:
1 = no penetration
2 = slight penetration, up to about 5% of the surface area
3 = distinct penetration, from about 5 to 15% of the surface area
4 = about 50% penetration
5 = complete penetration Another test is to determine the uptake of water as follows:

The air-dry, weighed test strips of paper are immersed for 1 minute in water at 20° C., subsequently squeezed between filter paper and weighed. The increase in weight is expressed as the water uptake in grams per square meter of paper. Good papers have low water uptake values.

The marks awarded in the ink float test (IFT) and in the water uptake (WU) test in g/m² at a pH of about 9.5 and about 6.0 of the sizing solution are shown in the following Tables:

| Sizing agent (SA) | pH | SA-conc. (%) | IFT (6 mins.) | WU |
|---|---|---|---|---|
| Sizing values on a paper I | | | | |
| comparison | 9.5 | 0.2 | 4 | 46.0 |
| | 6.0 | 0.2 | 5 | 70.0 |
| | 9.5 | 0.4 | 1.5 | 34.2 |
| | 6.0 | 0.4 | 5 | 64.0 |
| SA 18 | 9.5 | 0.2 | 3 | 34.0 |
| | 6.0 | 0.2 | 3 | 33.8 |
| | 9.5 | 0.4 | 1.5 | 31.9 |
| | 6.0 | 0.4 | 1.5 | 30.0 |
| SA 19 | 9.5 | 0.2 | 4.5 | 37.0 |
| | 6.0 | 0.2 | 4.5 | 32.8 |
| | 9.5 | 0.4 | 3.5 | 33.5 |
| | 6.0 | 0.4 | 3.5 | 33.0 |
| SA 20 | 9.5 | 0.2 | 4.5 | 38.2 |
| | 6.0 | 0.2 | 4.5 | 39.2 |
| | 9.5 | 0.4 | 3 | 34.0 |
| | 6.0 | 0.4 | 3 | 33.6 |
| Sizing values on paper II | | | | |
| Comparison | 9.5 | 0.2 | 5 | 70.0 |
| | 6.0 | 0.2 | 5 | 81.0 |
| | 9.5 | 0.4 | 4 | 49.0 |
| | 6.0 | 0.4 | 5 | 75.0 |
| SA 18 | 9.5 | 0.2 | 1 | 42.0 |
| | 6.0 | 0.2 | 1 | 42.2 |
| | 9.5 | 0.4 | 1 | 38.7 |
| | 6.0 | 0.4 | 1 | 36.6 |
| SA 19 | 9.5 | 0.2 | 1 | 42.6 |
| | 6.0 | 0.2 | 1 | 41.1 |
| | 9.5 | 0.4 | 1 | 40.9 |
| | 6.0 | 0.4 | 1 | 39.0 |
| SA 20 | 9.5 | 0.2 | 1.5 | 46.0 |
| | 6.0 | 0.2 | 2 | 45.5 |
| | 9.5 | 0.4 | 1 | 41.0 |
| | 6.0 | 0.4 | 1 | 38.4 |
| Sizing values on paper III | | | | |
| Comparison | 9.5 | 0.2 | 2 | 39.8 |
| | 6.0 | 0.2 | 5 | 63.0 |
| | 9.5 | 0.4 | 1 | 33.6 |
| | 6.0 | 0.4 | 5 | 59.0 |
| SA 18 | 9.5 | 0.2 | 1 | 32.9 |
| | 6.0 | 0.2 | 1 | 31.2 |
| | 9.5 | 0.4 | 1 | 30.1 |
| | 6.0 | 0.4 | 1 | 30.5 |
| SA 19 | 9.5 | 0.2 | 1.5 | 33.1 |
| | 6.0 | 0.2 | 1.5 | 31.4 |
| | 9.5 | 0.4 | 1 | 31.2 |
| | 6.0 | 0.4 | 1.5 | 29.8 |
| SA 20 | 9.5 | 0.2 | 1.5 | 32.2 |
| | 6.0 | 0.2 | 1.5 | 35.4 |
| | 9.5 | 0.4 | 1 | 31.6 |
| | 6.0 | 0.4 | 1.5 | 32.0 |

The above test values demonstrate the superiority of the sizing agents according to the present invention, particularly on chalk-containing paper. The high pH-stability of the present sizing agents, which is clearly discernible in all the papers, is also of particular interest.

For the sizing agents based on the reaction products with diamine and epichlorohydrin, the Examples relating to production of the polymers are summarised in Table 4, while the Examples relating to the reaction with diamine and epichlorohydrin are summarised in Table 5.

The polymers having the composition indicated in Table 4 are converted in selected samples into the sizing agents according to the present invention, as shown in Table 5. In the following, the number of the polymer corresponds to the number of the sizing agent.

The surface sizing effect is tested as described by the ink float-test. The measured times are shown as average values in Table 6.

Sizing agent 1 according to German Auslegeschrift No. 1,621,688 was used for comparison; it is extremely effective and consists of a dispersion of a butyl acrylate/acrylonitrile copolymer and the acetic acid salt of the reaction product of a styrene/maleic acid anhydride copolymer with 1-dimethylamino-3-propylamine and cyclohexylamine.

TABLE 4

| Polymer | | No. | 0 | 21 | 22 | 23 | 24 | 25 | 26 | 27 |
|---|---|---|---|---|---|---|---|---|---|---|
| Monomer (a) | a: | parts | 30 | 30 | 30 | 30 | 30 | 30 | 60 | 50 |
| Monomer (e) | a: | " | — | 1.5 | 0.75 | — | — | — | — | — |
| | b: | " | — | — | — | — | — | 1.5 | — | 0.5 |
| | c: | " | — | — | — | 1.5 | 0.75 | — | 3 | 1.5 |
| Monomer (b) | a: | " | 50 | 50 | 50 | 50 | 50 | 50 | 10 | 30 |
| | b: | " | — | — | — | — | — | — | — | — |
| | c: | " | — | — | — | — | — | — | — | — |
| Monomer (c) | a: | " | 20 | 20 | 20 | 20 | 20 | 20 | 30 | 20 |
| Monomer (d) | a: | " | — | — | — | — | — | — | — | — |
| Melt viscosity at 160° C. (Pas) | | | $2.85 \cdot 10^3$ | $4.7 \cdot 10^2$ | $5.5 \cdot 10^2$ | $2.4 \cdot 10^2$ | $1.65 \cdot 10^2$ | $2.2 \cdot 10^2$ | $4.5 \cdot 10^2$ | |

| Polymer | | No. | 28 | 29 | 30 | 31 | 32 | 33 | 34 | 35 |
|---|---|---|---|---|---|---|---|---|---|---|
| Monomer (a) | a: | parts | 45 | 35 | 25 | 40 | 30 | 20 | 20 | 35 |
| Monomer (e) | a: | " | — | — | — | — | — | — | — | — |
| | b: | " | — | — | — | — | — | — | — | — |
| | c: | " | 1.5 | 1.5 | 1.5 | 1.5 | 1.5 | 1.5 | 1.0 | 1.8 |
| Monomer (b) | a: | " | 45 | 55 | 65 | 40 | 50 | 60 | — | — |
| | b: | " | — | — | — | — | — | — | 55 | — |
| | c: | " | — | — | — | — | — | — | — | 40 |
| Monomer (c) | a: | " | 10 | 10 | 10 | 20 | 20 | 20 | 15 | 20 |
| Monomer (d) | a: | " | — | — | — | — | — | — | 10 | 5 |
| Melt viscosity at 160° C. | | | | | | | | | $3.1 \cdot 10^2$ | |

TABLE 4-continued (Pas)

TABLE 5

| Sizing agent No. | 26 | 27 | 28 | 29 | 30 | 31 | 32 | 33 | 34 | 35 |
|---|---|---|---|---|---|---|---|---|---|---|
| Polymer No. | 6 | 7 | 8 | 9 | 10 | 11 | 12 | 13 | 14 | 15 |
| Amine parts | 34 | 22.8 | 11.4 | 11.4 | 11.4 | 22.8 | 22.8 | 22.8 | 28.5 | 22.8 |
| Acetone | + | + | − | − | − | − | − | − | + | − |
| Isopropanol | − | − | + | + | + | + | + | + | − | + |
| 50% solution, parts | 50 | 50 | 50 | 50 | 50 | 50 | 50 | 50 | 50 | 50 |
| Water added, parts | 5 | 5 | 10 | 10 | 10 | 10 | 10 | 10 | 8 | 5 |
| Epichlorohydrin, parts | 5.4 | 3.5 | 1.8 | 1.8 | 1.8 | 3.5 | 3.5 | 3.5 | 2.7 | 2.0 |
| Water added, parts (dilution) | 120 | 120 | 115 | 115 | 115 | 115 | 115 | 115 | 113 | 120 |
| Acetic acid | 4.5 | 2.5 | 1.5 | 1.5 | 1.5 | 2.5 | 2.5 | 2.5 | 2.0 | 2.0 |
| Dispersion | − | − | + | + | − | − | − | − | + | − |
| Solution | + | + | − | − | + | + | + | + | − | + |

TABLE 6

| | Ink Float Test | |
|---|---|---|
| Sizing agent No. | Time I (mins.) | Time II (mins.) |
| Comparison | 25 | 65 |
| 26 | 20 | 80 |
| 27 | 30 | 60 |
| 28 | 18 | 52 |
| 30 | 16 | 50 |
| 32 | 28 | 58 |
| 35 | 29 | 48 |

The values obtained all lie in the technically required range.

The effect of the sizing agents was also tested on the following papers:
Paper I:
bleached cellulose
12% of talcum ash
1% of alum
75 g/m$^2$
Paper II:
bleached cellulose
10% of calcium carbonate ash (corrected CaO value)
80 g/m$^2$ The papers were treated with a size of the following composition in a conventional laboratory sizing press:
5% of starch
0.35% of active sizing agent
balance water
pH about 7.0

Sizing agent 1 according to German Auslegeschrift No. 1,621,688 was again used for comparison.

After the papers had been dried at 100° C. on a drying cylinder, they were conditioned for 2 hours at room temperature and the sizing effect thereof subsequently tested on the basis of the amount of water taken up. To this end, pieces of the paper were pre-weighed, immersed for 1 minute in water at 20° C., squeezed once between filter paper under a roller weighing 10 kg and then re-weighed. The value for the water uptake in both sides in g/m$^2$ was calculated from the difference between the two weights. The lower the water uptake, the better the sizing effect. The sizing effect may be regarded as good if a water uptake of about 40 g/m$^2$ or less is obtained.

The measured values are set out in Table 7.

TABLE 7

| Sizing agent No. | Water uptake [g/m$^2$] | |
|---|---|---|
| | paper I | paper II |
| Comparison | 30 | 41 |
| 29 | 49 | 49 |
| 31 | 29 | 40 |
| 33 | 48 | 45 |
| 34 | 32 | 39 |

The values obtained all lie in the usual technical range.

To test the pulp sizing effect, sheets of paper were produced from bleached sulphite pulp in a laboratory sheet-forming machine.

5 g of a mixture of 50 g of spruce sulphite cellulose 50 g of beech sulphate cellulose and 25 g of chalk are suspended in 200 ml of tap water. 0.8% of the sizing agent (solids based on cellulose plus filler) are then stirred in. The pulp is then made up with water to approximately 1 liter in the absence of a fixing agent and the sheet of paper is produced in a sheet-forming machine. The thus-formed sheet of paper is then pre-dried by suction and pressing and finally dried for 5 minutes at 120° C. on a drying cylinder. Strips measuring 2 cm×6 cm are cut from the sheet for the ink float test and tested.

After the papers had been conditioned for 2 hours at room temperature, the sizing effect was tested by the ink float test. Standard commercial fountain pen ink (undiluted) was used. Sizing agent 1 according to German Auslegeschrift No. 1,621,688 was again used for comparison. The measured values are set out in Table 8.

TABLE 8

| Ink Float Test after pulp sizing (1% addition) | |
|---|---|
| Comparison | more than 20 minutes |
| 26 | more than 20 minutes |
| 27 | more than 20 minutes |
| 31 | more than 20 minutes |
| 32 | more than 20 minutes |

A water uptake (g/m$^2$) of 33 was measured on the paper samples produced at pH 7 and finished with sizing agent No. 32. Values of 32 g/m$^2$ are obtained at pH 5.5 and pH 8.5.

If various other conventional paper auxiliaries are added during production of the paper, the water uptake values are only minimally affected (cf. Table 9):

TABLE 9

| Addition in %: | Water uptake [g/m²]: |
|---|---|
| 2 alum | 34 |
| 2 carboxymethyl cellulose | 31 |
| 2 cationic starch | 37 |
| 1 cationic polymer (Nadavin LT) | 34 |
| 1 cationic retention agent | |
| Retaminol E | 32 |
| Retaminol K | 32 |

These results reflect the wide tolerance range of the sizing effect obtained.

In the following Examples, the following preparation was used for the production of the test papers:

Pulp R 50 parts of bleached birch, sulphate cellulose and 50 parts of bleached pine sulphate cellulose are ground in a Hollander to fineness of from 35° to 40°SR at a pulp density of 2.5%. The pulp is then diluted with water to a total concentration of 1.7%, followed by further processing, optionally after the addition of auxiliaries, to form the papers.

The papers have a weight per unit area of about 80 g/cm².

The ink float test used to assess the sizing effect is carried out as follows:

The papers are cut into strips measuring 2×8 cm, placed on top of test ink according to DIN 51326 and the penetration of the ink after the specified time is visually assessed as follows:
1: no penetration
2: slight penetration, up to about 5% of the surface area
3: distinct penetration, from about 5 to 15% of the surface area
4: about 50% penetration
5: complete penetration.

Another test is to determine the water uptake as follows:

The air dried, weighed test strips of paper are immersed for 1 minute in water at 20° C., subsequently squeezed between filter paper and weighed. The increase in weight is expressed as the water uptake in grams per square meter of paper. Good papers have low water uptake values.

Polymer 36

A mixture of 225 parts of butyl acrylate, 50 parts of acrylonitrile, 100 parts of maleic acid anhydride and 6 parts of enol ether (c) (monomer type (e) is initially introduced into a reaction vessel equipped with a stirrer and reflux condenser. After heating to 170° C., a mixture of the following composition is introduced over a period of about 30 minutes: 125 parts of styrene, 1.5 parts of the same enol ether as above (c), 0.5 parts of t-butyl peroctoate, 0.5 parts of t-butyl hydroperoxide and 0.2 part of dicumyl peroxide. Polymerisation is then completed with stirring over a period of 3 hours at 170° C. 125 parts of 1-amino-3-dimethylaminopropane are then added and the mixture left to react for 3 hours at 170° C. The temperature is then reduced, with stirring, to from 100° to 120° C., 25 parts of acetic acid are added and 1650 parts of water pre-heated to about 80° C. introduced. An approximately 25% dispersion is formed, being adjusted after cooling to a solids content of about 15%.

Sizing Agent 36

5 parts of epichlorohydrin are added to 100 parts of the dispersion prepared as described above, followed by stirring for 2 hours while heating to 60° C. A sample concentrated by evaporation to dryness at 170° C. has a solids content of about 20%.

Before sheet formation, sizing agent 36 and the comparison material are added to pulp R in the specified quantity, after which the paper is produced with thorough stirring. The paper is then dried for about 150 seconds at 100° C. and thereafter weighs 80 g per square meter.

| Test Results: | | | |
|---|---|---|---|
| | Addition (%) | Water uptake (g/m²) | Ink Float test (10 mins.) |
| Sizing agent 36 | 0.4 | 97 | 3 |
| | 0.45 | 95 | 1 |
| | 0.5 | 87 | 1 |
| | 0.6 | 71 | 1 |
| Comparison | 0.7 | 97 | 3 |
| | 1.0 | 60 | 1 |

It may be seen that the sizing agent according to the present invention is approximately twice as active as the comparison sizing agent in regard to water uptake and the ink float test.

Polymer 37

150 parts of the following polymerisation mixture are initially introduced into and heated to 170° C. in a polymerisation vessel equipped with a stirrer and reflux condenser: 250 parts of styrene, 500 parts of butyl acrylate, 50 parts of acrylonitrile, 200 parts of maleic acid anhydride, 15 parts of the same enol ether as above (c), 1 part of t-butyl peroctoate, 1 part of t-butyl hydroperoxide and 0.4 part of dicumyl peroxide.

The rest of the reaction mixture is then uniformly introduced into the reaction vessel over a period of 30 minutes. The mixture is then left to polymerise for 2 hours at 170° C., after which 250 parts of 1-amino-3-dimethylaminopropane are added. The reaction mixture is then left to react for 3 hours at 170° C. The polymer melt is discharged and granulated after cooling.

Polymer 38

225 parts of butyl acrylate, 75 parts of acrylonitrile, 50 parts of maleic acid anhydride and 6 parts of the same enol ether as above (c) are initially introduced into a reaction vessel in the same way as before. After heating to 170° C., the following mixture is added over a period of 30 minutes: 150 parts of styrene, 1.5 parts of the same enol ether as above (c), 0.5 part of t-butyl peroctoate, 0.5 part of t-butyl hydroperoxide and 0.2 part of dicumyl peroxide. After polymerisation for 3 hours, 63 parts of 1-amino-3-dimethylaminopropane are added to the polymer melt formed, after which the reaction mixture is stirred for 3 hours at 170° C. The polymer melt is then cooled and granulated.

Polymer 39

250 parts of butyl acrylate, 50 parts of acrylonitrile, 75 parts of maleic acid anhydride and 6 parts of the same enol ether as above (c) are initially introduced into a polymerisation vessel in the same way as before. After heating to 170° C., the following mixture is uniformly introduced over a period of 30 minutes: 125 parts of styrene, 1.5 parts of the same enol ether as above (c), 0.5 part of t-butyl peroctoate, 0.5 part of t-butylhydroperoxide and 0.2 part of dicumyl peroxide. After polymerisation for 3 hours, 75 parts of 1-amino-3-dimethylaminopropane are added. After another 3 hours, the polymer melt formed is discharged and granulated.

Sizing agent 37

25 parts of polymer 17 are dissolved in 25 parts of acetone, followed by the addition of 3.5 parts of epichlorohydrin and 10 parts of water. After stirring for 1 hour at 20° C., 3.5 parts of acetic acid are added, followed by stirring for another 30 minutes. The product is then diluted with 115 parts of water. The solids content as determined by the evaporation test at 120° C. amounts to about 17%.

Sizing agent 38

The procedure is the same as for sizing agent 37, except that the epichlorohydrin is used in a quantity of only 1.8 parts. The solids content amounts to about 15%.

Sizing agent 39

The procedure is the same as for sizing agent 37, except that the epichlorohydrin is used in a quantity of 3.1 parts. The solids content amounts to about 16%.

Sizing agents 37 to 39 are tested as follows for the surface sizing effect thereof.

A raw paper of equal parts of softwood and hardwood cellulose having a weight per unit area of 75 g/m$^2$, a pH of 7.5 in the breast box and a kaolin ash content of 9% is treated in a Mathis type HF laboratory sizing press. The size uptake amounts to about 80%, based on the weight of the paper. In addition to water, the sizing liquid contains 0.2% of size solids and 5% of low-viscosity potato starch degraded by oxidation. The paper is then dried for about 200 seconds at 100° C.

Water uptake (WU) and resistance to ink (ink float test—IFT) are determined by the methods described above:

|  | WU (g/m$^2$) | pH 5–6 IFT (mins. to penetration) | WU (g/m$^2$) | pH 8.5 IFT (mins. to penetration) |
| --- | --- | --- | --- | --- |
| Sizing agent 37 | 36 | 20 | 37 | 20 |
| Sizing agent 38 | 39 | 15 | 39 | 15 |
| Sizing agent 39 | 38 | 12 | 42 | 10 |
| Comparison | 36 | 10 | 61 | 1 |

The above figures reflect the extreme effectiveness of the sizing agents according to the present invention and also the pH-stable activity thereof.

For the sizing agents based on the reaction products with diamine and acid, the Examples relating to the production of the polymers are summarised in Table 10 and the Examples relating to the reaction with diamine and acid in Table 11.

The polymers having the composition specified in Table 10 are converted in selected samples into the sizing agents according to the present invention as shown in Table 11. In the following, the number of the polymer corresponds to the number of the sizing agent.

The surface sizing effect is tested as described by the ink float test. The measured times are shown as average values in Table 12. Sizing agent 1 according to German Auslegeschrift No. 1,621,688 was again used for comparison.

TABLE 10

| Polymer | | No. | 0 | 40 | 41 | 42 | 43 | 44 | 45 |
| --- | --- | --- | --- | --- | --- | --- | --- | --- | --- |
| Monomer (a) | a: | parts | 30 | 30 | 40 | 30 | 40 | 40 | 60 |
| Monomer (e) | a: | " | — | 1.5 | 0.75 | — | — | — | — |
| | b: | " | — | — | — | — | — | 1.5 | 0.5 |
| | c: | " | — | — | — | 1.5 | 0.75 | — | 1.5 |
| Monomer (b) | a: | " | 50 | 50 | 50 | 50 | 52 | 50 | 30 |
| | b: | " | — | — | — | — | — | — | — |
| | c: | " | — | — | — | — | — | — | — |
| Monomer (c) | a: | " | 20 | 30 | 10 | 20 | 8 | 10 | 10 |
| Monomer (d) | a: | " | — | — | — | — | — | — | — |
| Melt viscosity at 160° C. (Pas) | | | 2.85·10$^3$ | 4.7·10$^2$ | 4.5·10$^2$ | 2.4·10$^1$ | 1.4·10$^2$ | 2.0·10$^2$ | |

| Polymer | | No. | 46 | 47 | 48 | 49 | 50 | 51 | 52 |
| --- | --- | --- | --- | --- | --- | --- | --- | --- | --- |
| Monomer (a) | a: | parts | 55 | 45 | 35 | 30 | 30 | 40 | 40 |
| Monomer (e) | a: | " | — | — | — | — | — | — | — |
| | b: | " | — | — | — | — | — | — | — |
| | c: | " | 1.5 | 1.5 | 1.5 | 1.5 | 1.5 | 1.0 | 1.0 |
| Monomer (b) | a: | " | 35 | 45 | 55 | 45 | 50 | 20 | 20 |
| | b: | " | — | — | — | — | — | 28 | — |
| | c: | " | — | — | — | — | — | — | 28 |
| Mononer (c) | a: | " | 10 | 10 | 10 | 10 | 10 | 12 | 12 |
| Monomer (d) | a: | " | — | — | — | 15 | 10 | — | — |
| Melt viscosity at 160° C. (Pas) | | | | | | 5.0·10$^2$ | 1.1·10$^2$ | | |

TABLE 11

| Sizing agent No. | 43 | 45 | 46 | 47 | 48 | 49 | 50 | 51 | 52 |
| --- | --- | --- | --- | --- | --- | --- | --- | --- | --- |
| Polymer No. | 43 | 45 | 46 | 47 | 48 | 49 | 50 | 51 | 52 |
| Amine, parts | 9.7 | 11.4 | 11.4 | 11.4 | 11.4 | 11.4 | 11.4 | 13.9 | 13.9 |
| Acetone | — | + | — | + | + | — | — | — | — |
| Isopropanol | + | — | + | — | — | + | + | + | — |
| 50% solution, parts | 50 | 50 | 50 | 50 | 50 | 50 | 50 | 50 | 50 |
| Acetic acid | 4.5 | 4.8 | 4.5 | 4.5 | 4.5 | 4.5 | 4.5 | 5.7 | 5.7 |
| Water added, parts (dilution) | 110 | 110 | 110 | 110 | 110 | 110 | 110 | 110 | 110 |
| Dispersion | + | + | + | — | +— | — | +— | + | + |

TABLE 11-continued

| Sizing agent No. | 43 | 45 | 46 | 47 | 48 | 49 | 50 | 51 | 52 |
|---|---|---|---|---|---|---|---|---|---|
| solution | − | − | − | + | −+ | + | −+ | − | − |

TABLE 12

| Sizing agent No. | Ink Float Test | |
|---|---|---|
| | Time I (mins.) | Time II (mins.) |
| Comparison | 80 | 80 |
| 4 | | 100 |
| 6 | | 95 |
| 7 | 85 | 105 |
| 8 | | 90 |
| 9 | | 115 |
| 10 | 85 | 95 |
| 11 | 80 | 100 |
| 12 | 60 | 85 |
| 13 | 60 | 80 |

The effect of the sizing agents was also tested in the following papers:
Paper I:
bleached cellulose
12% of talcum ash
1% of alum
75 g/m²
Paper II:
bleached cellulose
10% of calcium carbonate ash
(corrected CaO-value)
80 g/m²

The papers were treated with a size of the following composition in a conventional larboatory sizing press:
5% starch
0.5% of active sizing agent
balance water
pH about 7.0

Sizing agent 1 according to German Auslegeschrift No. 1,621,688 was again used for comparison.

After they has been dried at 100° C. on a drying cylinder, the papers were condition for 2 hours at room temperature, after which the sizing effect thereof was tested on the basis of the amount of water taken up. To this end, pieces of the paper were pre-weighed, immersed for 1 minute in water at 20° C., squeezed once between filter paper by means of a roller weighing 10 kg and reweighed. The value for the water uptake on both sides in g/m² was calculated from this difference between the sizing effect. The sizing effect may be regarded as good if a water uptake of about 40 g/m² or lower is obtained.

The measured values are set out in Table 13.

TABLE 13

| Sizing agent No. | Water uptake [g/m²] | |
|---|---|---|
| | Paper I | Paper II |
| Comparison | 30 | 44 |
| 46 | 22 | 30 |
| 48 | 26 | 40 |
| 49 | 20 | 32 |
| 50 | 22 | 31 |

To test the pulp sizing effect, sheets of paper were produced from bleached sulphite cellulose in a laboratory sheet-forming machine:

5 g of a mixture of 50 g of spruce sulphite cellulose, 50 g of beech sulphate cellulose and 25 g of chalk are suspended in 200 ml of tap water. 1% of the sizing agent (solids, based on cellulose plus filler) is then added. The pulp is then made up with water to approximately 1 liter in the absence of a fixing agent and the sheet of paper produced in a sheet-forming machine. The thus-produced sheet of paper is pre-dried by suction and pressing and then finally dried for 5 minutes at 120° C. on a drying cylinder. For the ink float test, strips measuring 2×6 cm were cut from the sheet and tested.

After the papers had been conditioned for 2 hours at room temperature, the sizing effect was tested by the ink float test. Standard fountain pen ink (undiluted) was used. Sizing agent 1 according to German Auslegeschrift No. 1,621,688 was again used for comparison. The measured values are set out in Table 14.

TABLE 14

| | Ink float test after pulp sizing (1% addition) |
|---|---|
| Comparison | more than 20 minutes |
| 46 | more than 20 minutes |
| 48 | more than 20 minutes |
| 49 | more than 20 minutes |
| 50 | more than 20 minutes |

In the following Examples, the following preparation was used for producing the test papers:
Pulp R 50 parts of bleached birch sulphate cellulose and 50 parts of bleached pine sulphate cellulose are ground to a fineness of from 35° to 40° SR in a Hollander at a pulp density of 2.5%. The pulp is then diluted with water to a total concentration of 1.7%, followed by further processing, optionally after the addition of auxiliaries, to form the papers.

The papers have a weight per unit area of about 80 g/cm².

The ink float test (IFT) used for assessing the sizing effect is carried out as follows:

The papers are cut into strips measuring 2×8 cm, placed on top of test ink according to DIN 53 126 and the penetration of the ink after the time indicated is visually assessed as follows:
1=no penetration
2=slight penetration, up to about 5% of the surface
3=distinct penetration, from about 5 to 15% of the surface
4=about 50% penetration
5=complete penetration.

Another test is to determine the water uptake as follows:

The air-dry weighed test strips of paper are immersed for 1 minute in water at 20° C. and then squeezed between filter paper and weighed. The increase in weight is expressed as the water uptake in grams per square meter of paper. Good papers have low water uptake values.

Polymer 53

A monomer mixture having the following composition is prepared at room temperature 250 parts of styrene, 450 parts of butyl acrylate, 150 parts of acrylonitrile, 150 parts of maleic anhydride (dissolved at about 60° C. and then cooled again), 15 parts of enol ether (c) (monomer type (e), 1 part of t-butyl peroctoate, 1 part of t-butyl hydroperoxide, 0.4 part of dicumyl peroxide.

About 150 parts of this mixture are introduced into a reaction vessel equipped with a stirrer and reflux condenser and heated to 170° C. The rest of the monomer mixture is then continuously introduced over a period of about 45 minutes. Polymerisation is then completed with stirring over a period of about 2 hours, after which 187 parts of 1-amino-3-dimethylaminopropane are added and the mixture stirred for another 3 hours at 170° C. The polymer is then discharged in the form of a melt and granulated after cooling.

Polymer 54

The procedure is the same as for Polymer 53, except that the composition of the monomers and the quantities in which they are used are altered as follows: acrylonitrile 100 parts, maleic acid anhydride 200 parts.

Polymer 55

250 parts of butyl acrylate, 50 parts of acrylonitrile, 50 parts of maleic acid anhydride and 6 parts of the same enol ether as above (c) are introduced into the polymerisation vessel described above.

After heating to 170° C., the following mixture is introduced over a period of about 30 minutes: 150 parts of styrene, 1.5 parts of the same enol ether as above (c), 0.5 part of t-butyl peroctoate, 0.5 part of t-butyl hydroperoxide, 0.2 part of dicumyl peroxide.

After stirring for 3 hours, 75 parts of 1-amino-3-dimethylaminopropane are added, followed by stirring for another 3 hours. The thinly liquid melt is then run off and granulated.

In all three cases, 25 parts of polymer are dissolved at 50° C. in 135 parts of water and 8 parts of acetic acid to form an about 15% aqueous dispersion-like preparation. The resulting preparations are referred to herein as sizing agents 53, 54 and 55.

For testing, the specified quantity of sizing agent, based on pulp, is added, with stirring, to the pulp R before sheet formation. The paper is then produced and dried for about 150 seconds at 100° C.

The following results are obtained:

| Addition 0.5% | Water uptake (g/m$^2$) | IFT (after 10 mins.) |
| --- | --- | --- |
| Sizing agent 53 | 71 | 1–2 |
| Sizing agent 54 | 73 | 1 |
| Sizing agent 55 | 106 | 1 |
| Comparison | 107 | 5 |

The Examples demonstrate the usefulness of the readily produced sizing agent preparations according to the present invention.

We claim:

1. A paper sizing agent in the form of an aqueous preparation of a maleic acid anhydride copolymer whose anhydride groups have been reacted with from 0.2 to 10 times the molar quantity of ammonia or a primary-tertiary diamine whose primary and tertiary amino groups are separated by a linear or branched chain having 2 to 6 carbon atoms and the resultant reaction product is subsequently reacted with epichlorohydrin or acetic acid, said copolymers containing polymerized units of
   (a) from 5 to 75% by weight of styrene,
   (b) from 10 to 75% by weight of a $C_1$–$C_{18}$ alkyl ester of acrylic acid, a $C_1$–$C_{18}$ alkyl ester of methacrylic acid or a mixture thereof,
   (c) from 5 to 30% by weight of maleic acid anhydride,
   (d) from 0 to 25% by weight of acrylonitrile, an α-olefin or a mixture thereof and
   (e) from 0.1 to 10% by weight, based on the weight of (a)–(d), of 1,2,5,6-tetrahydrobenzaldehyde, the benzyl enol ether of 1,2,5,6-tetrahydrobenzaldehyde or a mixture of 3-methyl and 4-methyl 1,2,5,6-tetrahydrobenzaldehyde.

2. A paper sizing agent of claim 1 wherein (b) is n-butyl acrylate, (d) is acrylonitrile, (e) is the benzyl enol ether of 1,2,5,6-tetrahydrobenzaldehyde, said primary-tertiary diamine is 1-dimethylamino-3-propylamine and epichlorohydrin is used for reaction with said resulting reaction product.

3. A process for producing the paper sizing agent of claim 1 wherein a monomer mixture of (a)–(e) is polymerized, with stirring, at from 120° to 250° C. in the presence of 0.01 to 3%, by weight, based on the sum of (a) to (d) of a radical initiator, the anhydride groups of the resulting copolymer are reacted with from 0.2 to 10 times the molar quantity of ammonia or a primary-tertiary diamine whose primary and tertiary amino groups are separated by a linear or branched chain having 2 to 6 carbon atoms and the resulting reaction product is subsequently reacted with epichlorohydrin or acetic acid.

4. The process of claim 3 wherein (b) is n-butyl acrylate, (d) is acrylonitrile, (e) is the benzyl enol ether of 1,2,5,6-tetrahydrobenzaldehyde, said primary-tertiary diamine is 1-dimethylamino-3-propylamine and epichlorohydrin is used for reaction with said resulting reaction product.

5. A process as claimed in claim 3 or 4 wherein said polymerization is carried out in the absence of a solvent.

* * * * *